(12) United States Patent
Murakata

(10) Patent No.: US 7,986,513 B2
(45) Date of Patent: Jul. 26, 2011

(54) BATTERY HOLDING MECHANISM AND ELECTRONIC DEVICE

(75) Inventor: Masato Murakata, Hyogo (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 12/567,372

(22) Filed: Sep. 25, 2009

(65) Prior Publication Data
US 2010/0079935 A1 Apr. 1, 2010

(30) Foreign Application Priority Data

Sep. 26, 2008 (JP) .................................. 2008-248579

(51) Int. Cl.
G06F 1/16 (2006.01)

(52) U.S. Cl. .................... 361/679.01; 320/118; 429/186; 713/500

(58) Field of Classification Search .................. 320/108, 320/112, 107, 118, 152; 361/679.01, 679.41, 361/679.27, 679.56, 679.55, 679.58, 679.29, 361/679.33, 679.47, 679.32; 429/180, 150, 429/61, 186, 100, 99, 163, 175, 178; 713/320, 713/500, 323, 300; 439/500, 83, 656, 157, 439/76.1, 824; 455/572, 575.3, 575.1, 558, 455/557, 90.3

See application file for complete search history.

(56) References Cited

U.S. PATENT DOCUMENTS

| | | | |
|---|---|---|---|
| 7,280,347 B2 * | 10/2007 | Wong et al. | 361/679.01 |
| 2005/0118501 A1 * | 6/2005 | Hashimoto et al. | 429/180 |
| 2005/0258804 A1 * | 11/2005 | Sakuma et al. | 320/112 |
| 2010/0289450 A1 * | 11/2010 | Kook | 320/108 |

FOREIGN PATENT DOCUMENTS

JP 2000-347283 A 12/2000

* cited by examiner

*Primary Examiner* — Hung V Duong
(74) *Attorney, Agent, or Firm* — Hamre, Schumann, Mueller & Larson, P.C.

(57) ABSTRACT

The battery pack holding mechanism according to the present invention Includes: a battery pack housing portion 4 in which a terminal electrode that is connected electrically to an electrode 12b of a connector is disposed and into which a battery pack is housed by being inserted along a pair of side walls 25a and 25b; and a holding member 31 that holds a battery pack 5 housed in the battery pack housing portion 4. The holding member 31 is disposed inside the pair of side walls 25a and 25b in the vicinity of the terminal electrode and has a pair of pinching portions 35a and 35b that are orthogonal to an insertion/removal direction in which the battery pack is inserted/removed and protrude toward opposed surfaces constituting an outer periphery of the battery pack, respectively. According to this configuration, the occurrence of a contact failure in a state where the battery pack is housed can be reduced.

10 Claims, 6 Drawing Sheets

BATTERY HOLDING MECHANISM AND ELECTRONIC DEVICE

BACKGROUND OF THE INVENTION

1. Field of the Invention

The present invention relates to a battery pack holding mechanism that can removably hold a battery pack. The present invention relates to an electronic device including a battery pack holding mechanism.

2. Description of Related Art

Portable electronic equipment of recent years such as a notebook personal computer, a digital camera, or the like can be equipped with a battery pack containing a battery and can be operated using power supplied from the battery pack.

JP 2000-347283 A discloses a battery pack housing portion and a lid body with which the battery pack housing portion can be enclosed. In this configuration, a battery pack is housed in the battery pack housing portion and the lid body is closed, thereby allowing the battery pack to be held.

FIG. 10 is a cross-sectional view showing a main portion of a camera disclosed by JP 2000-347283 A. In FIG. 10, connection terminals 102a and 102b are disposed in a battery pack housing portion 101. The connection terminals 102a and 102b can come in contact with terminals 104a and 104b of a battery pack 103. A lid body 105 is disposed so as to cover an opening portion of the battery pack housing portion 101.

With the above-described configuration, the connection terminals 102a and 102b come in contact with the terminals 104a and 104b of the battery pack 103 to hold the battery pack 103 by sandwiching it therebetween and the battery pack 103 is held in the battery pack housing portion 101.

However, in the configuration disclosed by JP 2000-347283 A, since the battery pack 103 is held merely by being sandwiched between the connection terminals 102a and 102b, when the equipment experiences vibrations, the terminals 104a and 104b of the battery pack 103 and the connection terminals 102a and 102b slide relative to each other. Because of this, the connection terminals 102a and 102b and the terminals 104a and 104b are worn out, thus making it more likely that a contact failure occurs between the connection terminal 102a and the terminal 104a and between the connection terminal 102b and the terminal 104b.

SUMMARY OF THE INVENTION

It is an object of the present invention to provide a battery pack holding mechanism that reduces the occurrence of a contact failure in a state where a battery pack is housed, and an electronic device including the same.

A battery pack holding mechanism according to the present invention is a battery pack holding mechanism that can hold a battery pack with an end provided with a connector and includes: a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion. The holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

An electronic device according to the present invention includes: an electronic component that is brought to an active state using power supplied from a battery pack with an end provided with a connector; a circuit substrate on which the electronic component is mounted; and a battery pack holding mechanism that can hold the battery pack. The battery pack holding mechanism includes: a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion. The holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

According to the present invention, when the battery pack is housed, wear due to sliding between an equipment main body side connector and a battery pack side connector can be reduced, and thus there can be provided a battery pack holding mechanism that allows a contact failure due to wear and heat generation caused by a contact failure to be suppressed, and an electronic device including the same.

DETAILED DESCRIPTION OF THE INVENTION

Figure 1:
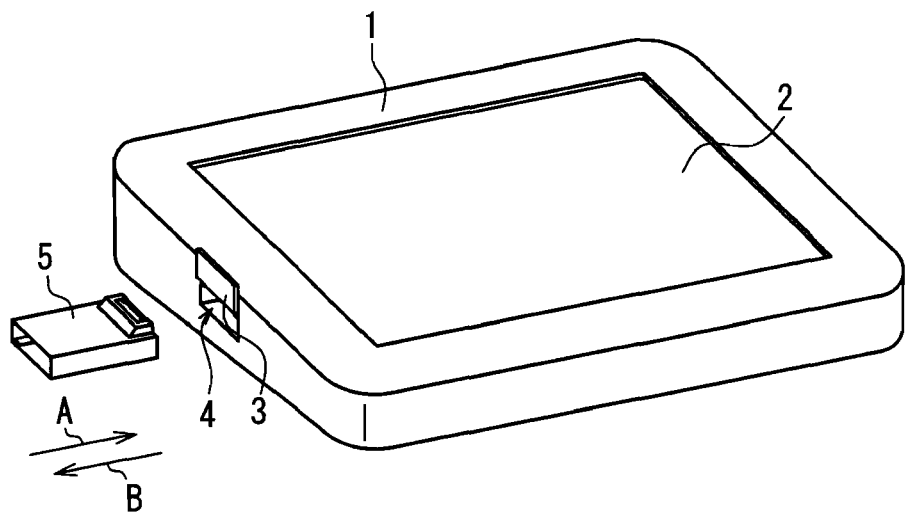
FIG. 1 is a perspective view of an information processing device according to an embodiment of the present invention.

A battery pack holding mechanism according to the present invention is a battery pack holding mechanism that can hold a battery pack with an end provided with a connector and includes: a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion. The holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

An electronic device according to the present invention includes: a battery pack with an end provided with a connector; an electronic component that is brought to an active state using power supplied from the battery pack; a circuit substrate on which the electronic component is mounted; and a battery pack holding mechanism that can hold the battery pack. The battery pack holding mechanism includes: a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion. The holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

Based on the above-described configuration, the battery pack holding mechanism and electronic device according to the present invention can be embodied variously.

The battery pack holding mechanism according to the present invention can be configured as follows. That is, the holding member includes: a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted. Each of the pinching portions is formed between the first inclined portion and the second inclined portion. A boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion. According to this configuration, it is possible to establish a connection between the electrode of the connector of the battery pack and the terminal electrode after the completion of a positional adjustment and an inclination adjustment of the battery pack. Thus, in a state where the battery pack is housed in the battery pack housing portion, the occurrence of a phenomenon in which the electrode in the connector of the battery pack and the terminal electrode slide relative to each other under an impact or the like can be reduced, thereby suppressing a contact failure attributable to wear of the connector and/or the terminal electrode due to the sliding therebetween.

The battery pack holding mechanism according to the present invention can have a configuration in which the holding member has a coupling portion that couples the pair of pinching portions to each other. According to this configuration, the pair of pinching portions can be provided so as to extend proportionately relative to the battery pack housing portion, and thus a positional adjustment and an inclination adjustment of each of the pair of pinching portions can be performed with increased accuracy. Moreover, in the holding member, the pair of pinching portions can be coupled to form one member, and thus the number of components can be reduced, thereby allowing a cost reduction to be achieved.

The electronic device according to the present invention can be configured as follows. That is, the holding member includes: a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted. Each of the pinching portions is formed between the first inclined portion and the second inclined portion. A boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion. According to this configuration, it is possible to establish a connection between the electrode of the connector of the battery pack and the terminal electrode after the completion of a positional adjustment and an inclination adjustment of the battery pack. Thus, in a state where the battery pack is housed in the battery pack housing portion, the occurrence of a phenomenon in which the electrode in the connector of the battery pack and the terminal electrode are slid past each other under an impact or the like can be reduced, thereby allowing the suppression of a contact failure attributable to wear of the connector and/or the terminal electrode due to sliding therebetween.

The electronic device according to the present invention can have a configuration in which the holding member has a coupling portion that couples the pair of pinching portions to each other. According to this configuration, the pair of pinching portions can be provided so as to extend proportionately relative to the battery pack housing portion, and thus a positional adjustment and an inclination adjustment of each of the pair of pinching portions can be performed with increased accuracy. Moreover, in the holding member, the pair of pinching portions can be coupled to form one member, and thus the number of components can be reduced, thereby allowing a cost reduction to be achieved.

The electronic device according to the present invention can have a configuration in which the battery pack includes a fitting concave portion into which each of the pinching portions can be fitted. According to this configuration, it is possible to control a displacement of the battery pack in a direction orthogonal to an insertion direction of the battery pack. Therefore, the battery pack can be positioned in a proper position, and thus a connection between the connector and the terminal electrode can be established reliably.

The electronic device according to the present invention can have a configuration in which the battery pack includes a guide slot that can guide each of the pinching portions to the fitting concave portion. According to this configuration, it is possible to control a displacement of the battery pack in a direction orthogonal to an insertion direction of the battery pack. Therefore, the battery pack can be positioned in a proper position, and thus a connection between the connector and the terminal electrode can be established reliably.

The expression that "an electronic component is in an active state" in the electronic device according to the present invention refers to, in the case where the electronic device is, for example, an information processing device including an information processing circuit that processes a desired information signal, a state where the information processing circuit processes information. Further, in the case where the electronic device is, for example, a video device that generates a video of visual information in accordance with a visual signal, the above-described expression refers to a state where a display panel included in the video device is energized to display the video thereon. That is, the above-described expression refers to a state where the electronic device performs a predetermined operation using power supplied from the battery pack.

EMBODIMENT

[1. General Description of Battery Pack Holding Mechanism]

Figure 2:
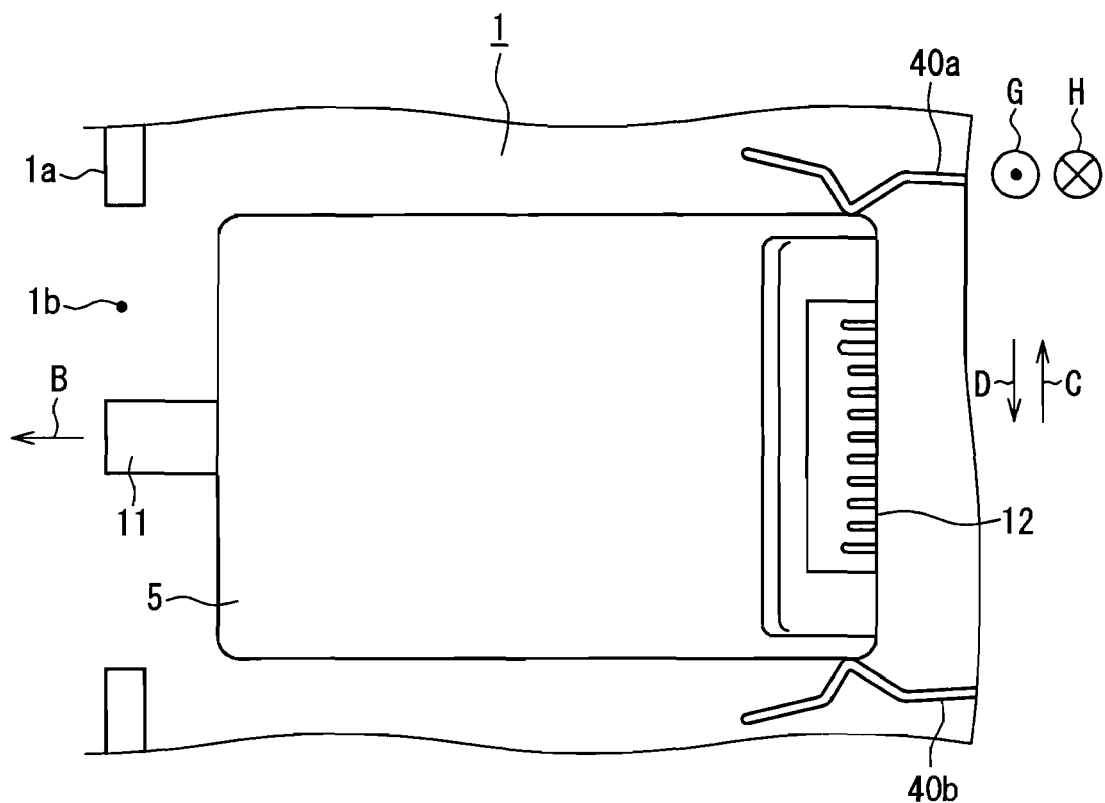
FIG. 2 is a schematic view of a battery pack holding mechanism.

A battery pack holding mechanism according to this embodiment has a configuration characterized mainly in that holding members hold a battery pack by sandwiching it therebetween, thereby allowing the battery pack to be held. FIG. 1 is a perspective view of a main body (hereinafter, referred to as a main body) 1 of an information processing device and a battery pack 5. FIG. 2 is a schematic view of the vicinity of a battery pack housing portion 4 in FIG. 1. FIG. 1 shows a state before the battery pack is held in the battery pack holding mechanism. FIG. 2 shows a state where the battery pack is held in the battery pack holding mechanism.

As shown in FIG. 2, the main body 1 includes holding members 40a and 40b. In a state where the battery pack 5 is housed in the main body 1, the holding members 40a and 40b hold a pair of side surfaces of the battery pack 5 by sandwiching them therebetween and thus can hold the battery pack 5. The holding members 40a and 40b are made of an elastic deformable material such as, for example, a wire. The holding members 40a and 40b, while holding the battery pack 5, are deformed in such directions away from each other, respectively, and hold the battery pack 5 using a force with which the holding members 40a and 40b attempt to return to their original positions. According to this configuration, even in the case where a lid body 3 is opened by accident in a state where the battery pack 5 is housed, the battery pack 5 can be prevented from falling off the battery pack holding mechanism under its own weight.

Furthermore, when a tape 11 provided on the battery pack 5 is grasped and pulled in a direction indicated by an arrow B, the battery pack 5 can be taken out through an opening portion lb formed in a casing la of the main body 1.

Figure 3:
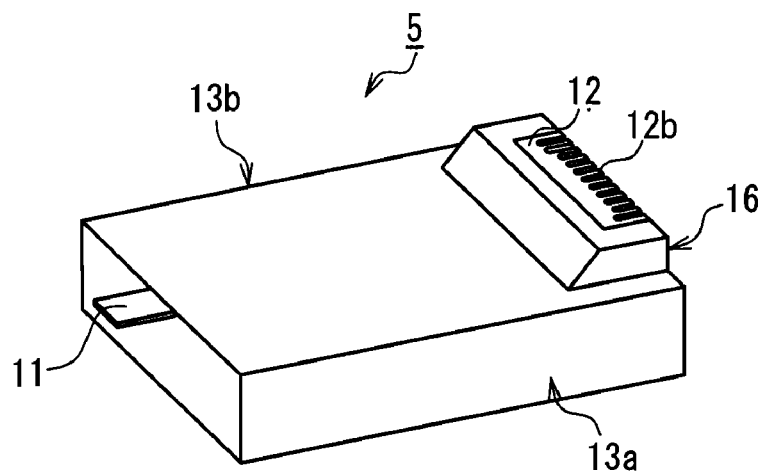
FIG. 3 is a perspective view of a battery pack according to the embodiment of the present invention.

Furthermore, the holding members 40a and 40b are configured so as to be spaced at a distance reduced with respect to an insertion direction of the battery pack 5, and thus when holding the battery pack 5, the holding members 40a and 40b can guide a battery side connector 12 included in the battery pack 5 toward such a position as to allow the battery side connector 12 to be connected reliably to a main body side connector (not shown) included in the main body 1. That is, in a process of inserting the battery pack 5 into the battery pack housing portion 4, corner portions constituted by a pair of side surfaces 13a and 13b of the battery pack 5 and a front surface 16 of the battery pack 5, which are shown in FIG. 3, come in contact with the holding members 40a and 40b. This allows the battery pack 5 to be guided to move so as to establish an electrical connection between the battery side connector 12 and the main body side connector.

[2. Specific Configuration of Battery Pack Holding Mechanism]

FIG. 1 is a perspective view of an information processing device as an example of an electronic device according to this embodiment. The main body 1 includes a monitor 2. The monitor 2 is formed of, for example, a touch panel type display. The operator touches a display surface of the monitor 2 with a stylus pen (not shown), the finger, or the like and thus can input a desired information signal. The main body 1 is capable of generating a visual signal based on the inputted information signal and displaying it on the monitor 2. Further, the main body 1 can have a configuration including operation buttons (not shown).

On a side surface of the main body 1, the battery pack housing portion 4 is provided.

The battery pack housing portion 4 can house the battery pack 5. The battery pack housing portion 4 is disposed in the main body 1, in such a posture that the insertion direction of the battery pack 5 is substantially parallel to a plane containing a display surface of the monitor 2.

The battery pack 5 can be inserted into the battery pack housing portion 4 in a direction indicated by an arrow A. Further, when the battery pack 5 housed in the battery pack housing portion 4 is pulled out in the direction indicated by the arrow B, the battery pack 5 can be removed from the battery pack housing portion 4. Herein, the battery pack 5 may include a single battery or a case housing a plurality of the batteries.

The lid body 3 is disposed on a surface portion of the main body 1 in the battery pack housing portion 4. The lid body 3 is disposed on the side surface of the main body 1. By the configuration in which the lid body 3 is provided on the side surface of the main body 1 and the battery pack housing portion 4 is disposed in the main body 1, in such a posture that the insertion direction of the battery pack 5 is substantially parallel to the plane direction of the display surface of the monitor 2, a thickness reduction of the main body 1 can be achieved. The lid body 3 can open/close the opening portion of the battery pack housing portion 4.

FIG. 3 is a perspective view of the battery pack 5. The battery pack 5 includes the tape 11 and the battery side connector 12.

The tape 11 is a portion grasped by the user when the battery pack 5 is pulled out from the battery pack housing portion 4 in the direction indicated by the arrow B shown in FIG. 1. That is, in a state where the battery pack 5 is housed in the battery pack housing portion 4, the tape 11 protrudes from the battery pack housing portion 4 or the main body 1. Preferably, in a state where the battery pack 5 is housed in the battery pack housing portion 4 or in the main body 1, the tape 11 protrudes from the battery pack housing portion 4 or from the main body 1 in an amount such as to allow the user to grasp it, for example, with the finger tips. Further, preferably, when the battery pack 5 is housed in the battery pack housing portion 4, the tape 11 can be bent in the battery pack housing portion 4 along the side surface of the battery pack 5. Preferably, the tape 11 is made of a bendable material, and as the material, materials having flexibility and resistance to a tensile force such as, for example, doth and plastic can be used suitably.

The battery side connector 12 is disposed at an end of the battery pack 5. The battery side connector 12 includes electrodes 12b. The electrodes 12b can be connected electrically (hereinafter, expressed simply as "connected") to terminal electrodes contained in the battery pack housing portion 4. The electrodes 12b include a plurality of concave portions formed on the battery side connector 12 and an electrode pattern provided in each of the concave portions. The concave portions have such a size as to allow the terminal electrodes of a main body side connector 22 to be inserted into/removed from the concave portions. The electrodes 12b in the battery side connector 12 are connected to the terminal electrodes of the main body side connector 22, and thus the main body 1 can be supplied with power.

Figure 4:
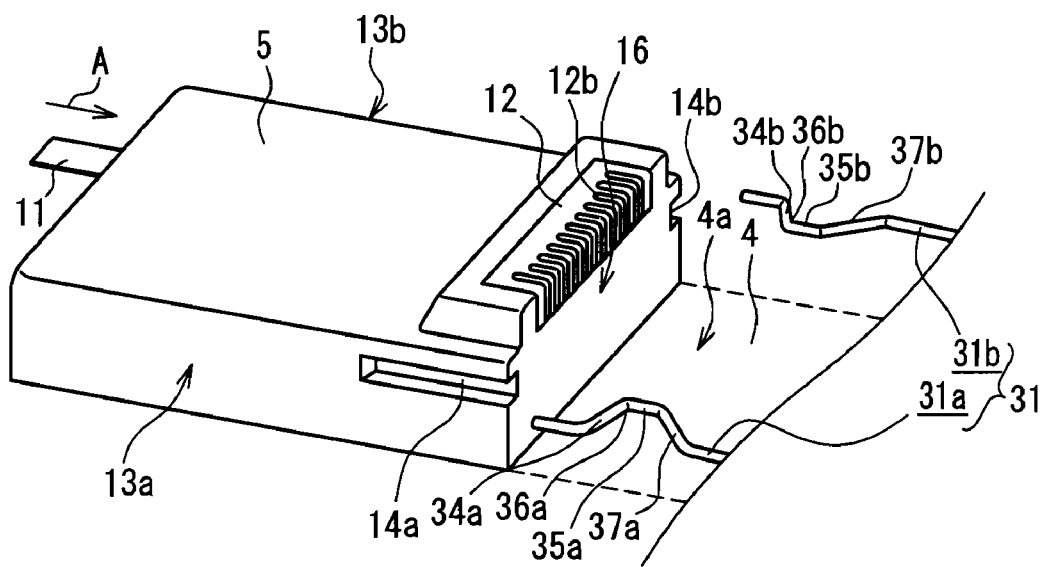
FIG. 4 is a perspective view of a mechanism for holding a battery pack 5 according to the embodiment of the present invention.

FIG. 4 is a schematic view of the battery pack holding mechanism. In FIG. 4, for the explanation of a mechanism for holding the battery pack 5, a depiction of a detailed configuration is omitted. The battery pack 5 is inserted into the battery pack housing portion 4, in such a posture that the front surface 16 thereof is oriented forward in the insertion direction (direction indicated by an arrow A). A guide slot 14a is formed on the side surface 13a of the battery pack 5. A guide slot 14b is formed on the side surface 13b. Hereinafter, the direction indicated by the arrow A is referred to as the "insertion direction of the battery pack 5". Further, an inward side with respect to the side of an opening of the battery pack housing portion 4 is referred to as a side "forward in the direction indicated by the arrow A".

A holding member 31 can hold the battery pack 5. The holding member 31 has a first holding member 31a and a second holding member 31b, which are disposed parallel to an insertion/removal direction of the battery pack 5.

The first holding member 31a has a first inclined portion 34a, a second inclined portion 37a, and a pinching portion 35a. The first inclined portion 34a is a portion that is inclined from an exterior toward an interior of the battery pack housing portion 4 with respect to the direction indicated by the arrow A. The second inclined portion 37a is a portion that is inclined from the interior toward the exterior of the battery pack housing portion 4 at a position forward of a position at which the first inclined portion 34a is formed in the direction indicated by the arrow A. The pinching portion 35a is formed between the first inclined portion 34a and the second inclined portion 37a and can come in contact with the battery pack 5. A boundary portion 36a is a contact point between the pinching portion 35a and the first inclined portion 34a.

The second holding member 31b has a first inclined portion 34b, a second inclined portion 37b, and a pinching portion 35b. The first inclined portion 34b is a portion that is inclined from the exterior toward the interior of the battery pack housing portion 4 in the direction indicated by the arrow A. The second inclined portion 37b is a portion that is inclined from the interior toward the exterior of the battery pack housing portion 4 at a position forward of a position at which the first inclined portion 34b is formed. The pinching portion 35b is formed between the first inclined portion 34b and the second inclined portion 37b and can come in contact with the battery pack 5. A boundary portion 36b is a contact point between the pinching portion 35b and the first inclined portion 34b.

The first inclined portions 34a and 34b and the second inclined portions 37a and 37b may be disposed so as to extend from the interior to the exterior of the battery pack housing portion 4, and also may be disposed within the battery pack housing portion 4.

Figure 5A:
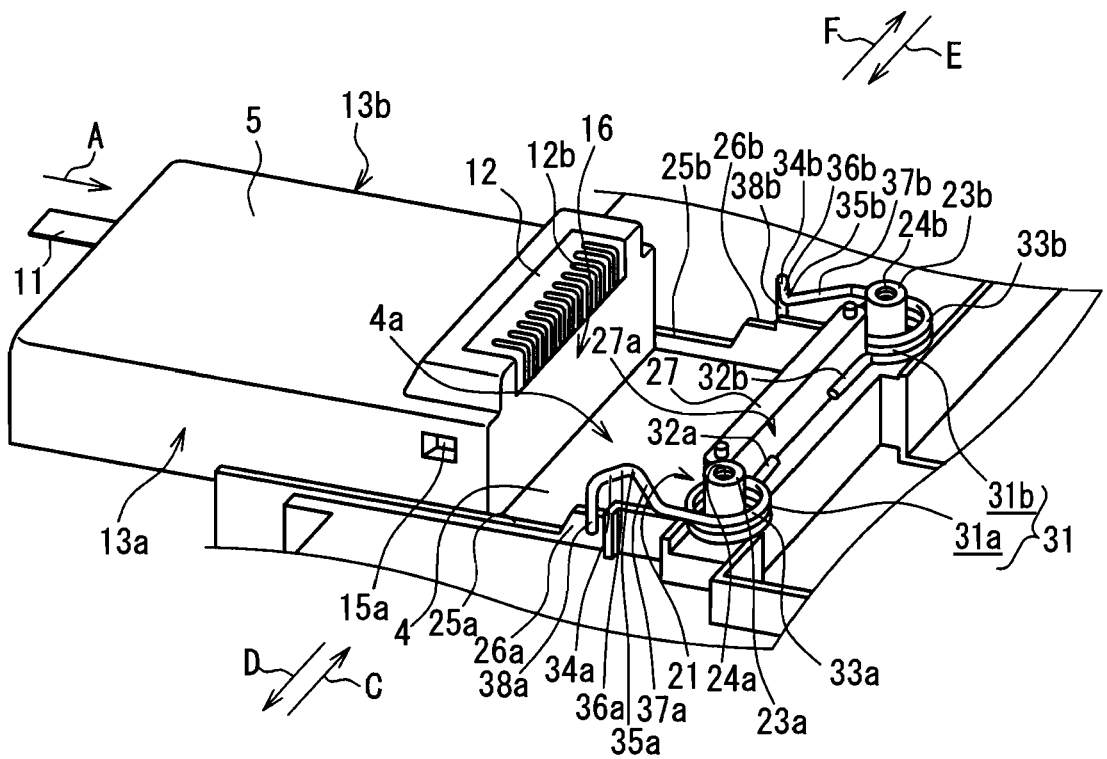
FIG. 5A is a perspective view of the vicinity of a battery pack housing portion in a main body according to another embodiment of the present invention.

The pinching portion 35a and the pinching portion 35b are formed with planar symmetry with respect to housing side walls 25a and 25b of the battery pack housing portion 4 (see FIG. 5A, etc.). Specifically, the pinching portion 35a and the pinching portion 35b are disposed with planar symmetry with respect to a plane parallel to the side surfaces 13a and 13b of the battery pack 5. The pinching portion 35a and the pinching portion 35b come in contact with the battery pack 5 and thus hold the battery pack 5 by sandwiching it therebetween.

When the battery pack 5 is inserted into the battery pack housing portion 4, first, the first inclined portions 34a and 34b come in contact with the front surface 16 of the battery pack 5. When the battery pack 5 is moved further forward in the insertion direction, the first holding member 31a and the second holding member 31b are pressed by the front surface 16 toward the outside of the battery pack housing portion 4 and thus are displaced. When the battery pack 5 is moved still further forward in the insertion direction, the pinching portion 35a is fitted into the guide slot 14a and the pinching portion 35b is fitted into the guide slot 14b.

The first holding member 31a and the second holding member 31b are displaced toward the outside of the battery pack housing portion 4, so that a pressing force toward the inside of the battery pack housing portion 4 is generated. In the pinching portions 35a and 35b, a force with which they hold the battery pack 5 by sandwiching it therebetween is generated. Thus, the battery pack 5 is held stably in the battery pack housing portion 4, with the pinching portion 35a fitted into the guide slot 14a and the pinching portion 35b fitted into the guide slot 14b.

Although in this embodiment, the pinching portions 35a and 35b have a linear shape (shape such that they make line contact with the guide slots 14a and 14b) as shown in FIG. 4, the shape thereof is not limited thereto. It is only required that the pinching portions 35a and 35b have such a shape as at least to allow the battery pack 5 to be held by being sandwiched therebetween. The pinching portions 35a and 35b may have, for example, a V shape protruding toward the inside of the battery pack housing portion 4 (shape such that they make point contact with the guide slots 14a and 14b). Further, as long as the battery pack 5 can be held at least by the pinching portions 35a and 35b, it is not required that the guide slots 14a and 14b be provided on the side surfaces 13a and 13b of the battery pack 5, respectively.

Furthermore, as described above, in this embodiment, the pinching portions 35a and 35b are shaped so as to be spaced from each other at a distance reduced with respect to the direction indicated by the arrow A and thus can guide the battery pack 5 to such a position as to allow a connection between the battery side connector 12 and the main body side connector 22 (which will be described later) to be established reliably. In this embodiment, the pinching portions 35a and 35b have a shape with planar symmetry with respect to the housing side walls, and thus centering in a plane direction (directions indicated by arrows C and D and directions indicated by arrows G and H in FIG. 2) of a plane orthogonal to the direction indicated by the arrow A (insertion direction of the battery pack 5) can be achieved. Thus, when the battery pack 5 is inserted into and pulled out of the battery pack housing portion 4, it is possible to inhibit a bias force of each of the pinching portions 35a and 35b applied to the battery pack 5 from acting in a rotation direction of the battery pack 5 (direction of a rotation about the arrow B shown in FIG. 2 as a center axis). This configuration is preferable because it can prevent the battery side connector 12 and the main body side connector, for example, from being worn out due to swinging and coming in contact with each other.

[3. Another Embodiment of Battery Pack Holding Mechanism]

Figure 5B:
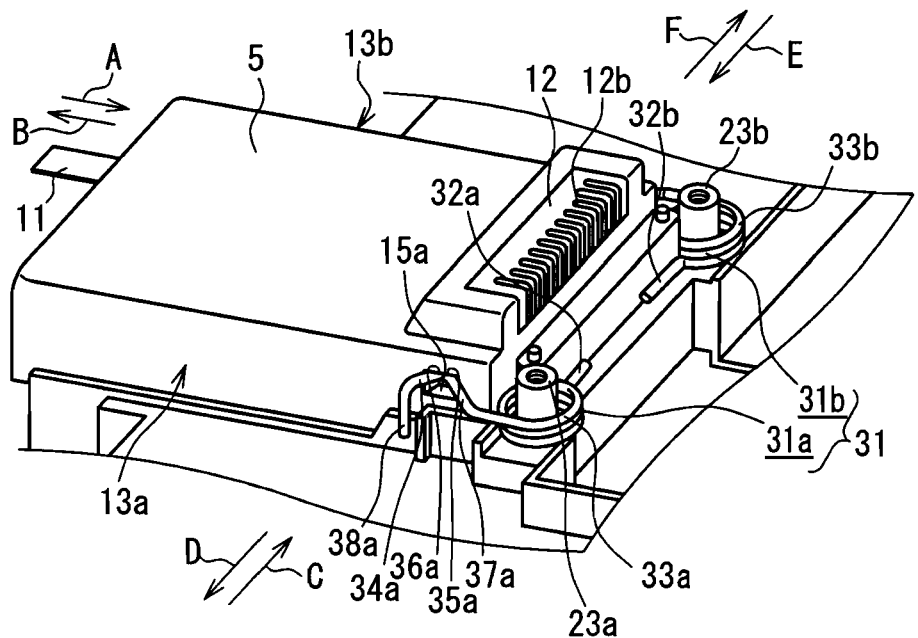
FIG. 5B is a perspective view showing a state where a battery pack is housed completely in the battery pack housing portion according to another embodiment of the present invention.
Figure 6:
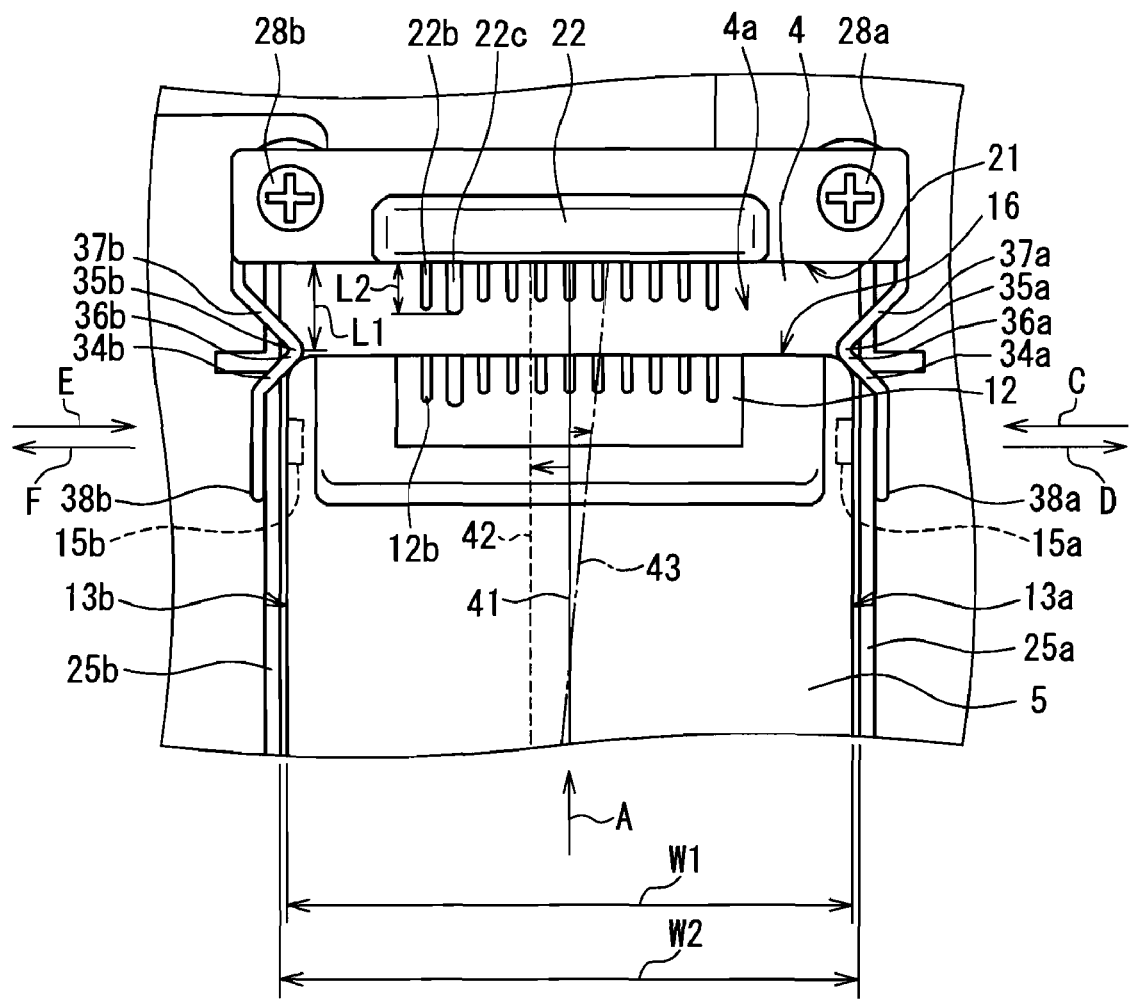
FIG. 6 is a plan view showing a state of the battery pack housing portion according to another embodiment of the present invention, into which the battery pack is inserted partially.
Figure 7:
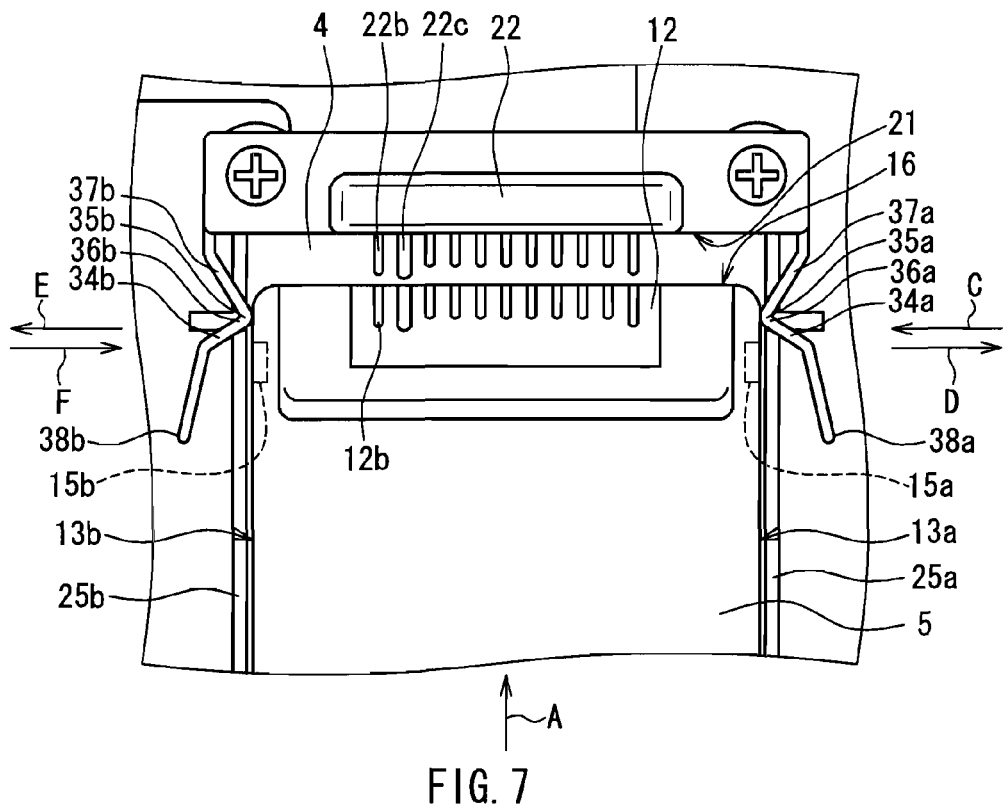
FIG. 7 is a plan view showing a state of the battery pack housing portion according to another embodiment of the present invention, into which the battery pack is inserted further than in the state shown in FIG. 5B.
Figure 8:
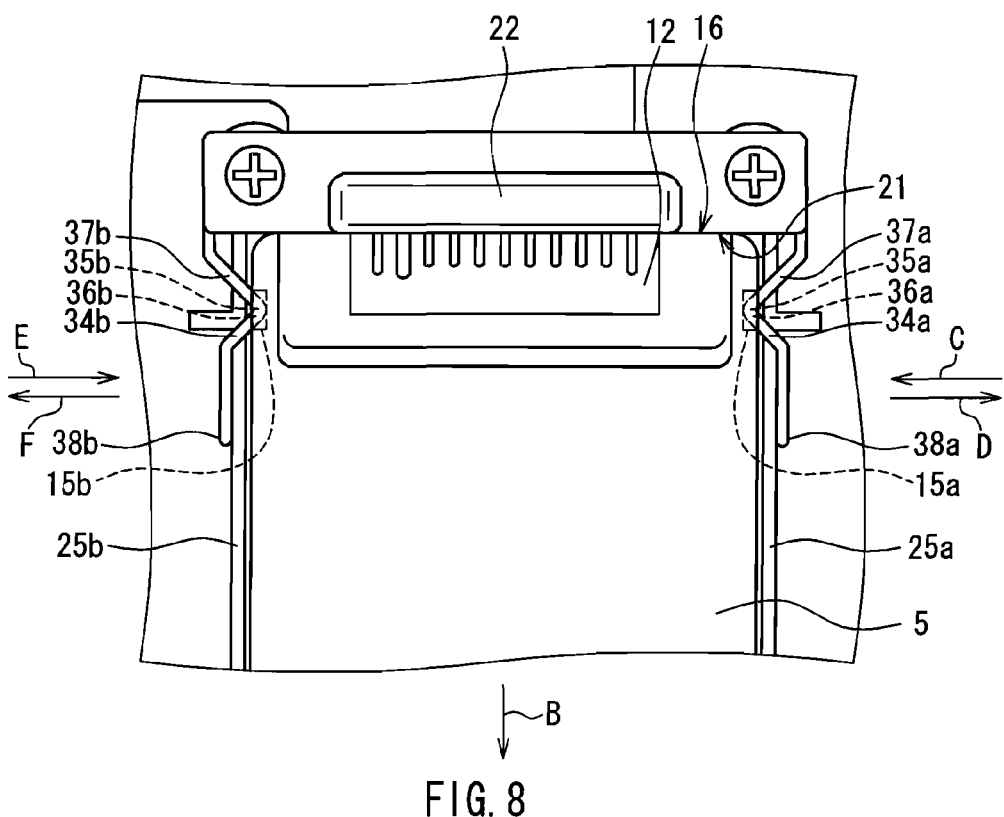
FIG. 8 is a plan view showing a state of the battery pack housing portion according to another embodiment of the present invention, into which the battery pack is inserted completely.

FIG. 5A is a perspective view showing in greater detail, a configuration in the vicinity of the battery pack housing portion 4 in the main body 1. For ease of viewing, FIG. 5A shows a state where part of the battery pack 5 is inserted into the battery pack housing portion 4 in a direction indicated by an arrow A. Further, for ease of viewing, in FIG. 5A, some components are not depicted. FIG. 5B is a perspective view showing a state where the battery pack 5 is housed in the battery pack housing portion 4. Each of FIGS. 6, 7 and 8 is a plan view showing a main portion in the vicinity of the main body side connector when the battery pack 5 is housed in the battery pack housing portion 4.

In FIG. 5A, a deepest portion 21 is a portion with which the front surface 16 of the battery pack 5 come in contact when the battery pack 5 is housed completely in the battery pack housing portion 4. On a mounting stage 27, the main body side connector 22 (see FIG. 6) is mounted. The main body side connector 22 (see FIG. 6) includes supporting portions 23a and 23b. The supporting portions 23a and 23b are formed on the mounting stage 27. Screw holes 24a and 24b are formed in the supporting portions 23a and 23b, respectively. A screw thread 28a (see FIG. 6) is screwed into the screw hole 24a and a screw thread 28b (see FIG. 6) is screwed into the screw hole 24b, and thus the main body side connector 22 is supported on the mounting stage 27.

The housing portion side walls 25a and 25b guide the battery pack 5 in the battery pack housing portion 4. An end supporting portion 26a is formed on the housing portion side wall 25a. An end supporting portion 26b is formed on the housing portion side wall 25b. A pair of bent portions 38a and 38b of the holding member 31 can be latched to the end supporting portions 26a and 26b, respectively. In this embodiment, the end supporting portions 26a and 26b are plate-shaped.

The first holding member 31a and the second holding member 31b (hereinafter, both are referred to collectively as the holding member 31) are formed of a linear member made of metal. The first holding member 31a is disposed from the outside of a rear surface 27a and the side wall 25a toward the inside of the battery pack housing portion 4. The second holding member 31b is disposed from the outside of the rear surface 27a and the side wall 25b toward the inside of the battery pack housing portion 4. The rear surface 27a is a surface of the mounting stage 27 on an opposite side of the deepest portion 21.

The first holding member 31a has an end 32a, a wire wound portion 33a, the second inclined portion 37a, the pinching portion 35a, the first inclined portion 34a, and the bend portion 38a. The wire wound portion 33a is formed of the linear member wound in a circle shape or a spiral shape. The wire wound portion 33a is fitted around the supporting portion 23a. By this configuration in which the wire wound portion 33a is fitted around the supporting portion 23a, the first holding member 31a is supported in the main body 1. Two ends extended from the wire wound portion 33a extend in directions substantially orthogonal to each other. The end 32a, which is one of the two ends, is in contact with the rear surface 27a or is positioned in the vicinity of the rear surface 27a. As the other end of the linear member, the second inclined portion 37a, the pinching portion 35a, the first inclined portion 34a, and the bent portion 38a are formed in this order from a side of the wire wound portion 33a.

When the first holding member 31a is supported around the supporting portion 23a, the end 32a can be latched to the rear surface 27a of the mounting stage 27. In a state where the end 32a is latched to the rear surface 27a, the wire wound portion 33a biases the pinching portion 35a in a direction indicated by an arrow C.

Basic configurations of the first inclined portion 34a, the pinching portion 35a, and the second inclined portion 37a are similar to those shown in FIG. 4. However, in the embodiment shown in FIG. 5A, etc., the pinching portion 35a does not have a linear shape but has a V shape. That is, the first inclined portion 34a, the pinching portion 35a, and the second inclined portion 37a form a V shape. In this shape, the boundary portion 36a is in a position that substantially coincides with a position of the pinching portion 35a. The pinching portion 35a is disposed in the vicinity of the main body side connector 22.

The bent portion 38a extends from the first inclined portion 34a and is bent so that it can be latched to the end supporting portion 26a. The bent portion 38a is latched to the end supporting portion 26a and the end 32a is latched to the rear surface 27a, and thus the first holding member 31a is prevented from being displaced in a direction in which it is biased by the wire wound portion 33a (direction indicated by the arrow C). Since the bent portion 38a is in contact with the end supporting portion 26a, the first holding member 31a can be displaced in a direction opposite to the above-described direction (direction indicated by an arrow D) under its own biasing force. Therefore, the pinching portion 35a can be displaced in the direction indicated by the arrow D.

The second holding member 31b has an end 32b, a wire wound portion 33b, the second inclined portion 37b, the pinching portion 35b, the first inclined portion 34b, and the bent portion 38b. The wire wound portion 33b is formed of the linear member wound in a circle shape or a spiral shape. The wire wound portion 33b is fitted around the supporting portion 23b. By this configuration in which the wire wound portion 33b is fitted around the supporting portion 23b, the second holding member 31b is supported in the main body 1. Two ends extended from the wire wound portion 33b extend in directions substantially orthogonal to each other. The end 32b, which is one of the two ends, is in contact with the rear surface 27a or is positioned in the vicinity of the rear surface 27a. As the other end of the linear member, the second inclined portion 37b, the pinching portion 35b, the first inclined portion 34b, and the bent portion 38b are formed in this order from a side of the wire wound portion 33b.

When the first holding member 31b is supported around the supporting portion 23b, the end 32b can be latched to the rear surface 27a of the mounting stage 27. In a state where the end 32b is latched to the rear surface 27a, the wire wound portion 33b biases the pinching portion 35b in a direction indicated by an arrow E.

Basic configurations of the first inclined portion 34b, the pinching portion 35b, and the second inclined portion 37b are similar to those shown in FIG. 4. However, in the embodiment shown in FIG. 5A, etc., the pinching portion 35b does not have a linear shape but has a V shape. That is, the first inclined portion 34b, the pinching portion 35b, and the second inclined portion 37b form a V shape. In this shape, the boundary portion 36b is in a position that substantially coincides with a position of the pinching portion 35b. For ease of viewing, in each of FIGS. 5A to 9, the pinching portion 35a and the boundary portion 36a are depicted in positions shifted from each other, and the same applies to the pinching portion 35b and the boundary portion 36b. The pinching portion 35b is disposed in the vicinity of the main body side connector 22.

The bent portion 38b extends from the first inclined portion 34b and is bent so that it can be latched to the end supporting portion 26b. The bent portion 38b is latched to the end supporting portion 26b and the end 32b is latched to the rear surface 27a, and thus the second holding member 31b is prevented from being displaced in a direction in which it is biased by the wire wound portion 33b (direction indicated by the arrow E). Since the bent portion 38b is in contact with the end supporting portion 26b, the second holding member 31b can be displaced in a direction opposite to the above-described direction (direction indicated by an arrow F) under its own biasing force. Therefore, the pinching portion 35b can be displaced in the direction indicated by the arrow F.

As shown in FIG. 5A, concave portions 15a and 15b are formed on the side surfaces 13a and 13b of the battery pack 5, respectively. When the battery pack 5 is housed completely in the battery pack housing portion 4, the pinching portion 35a can be fitted into the concave portion 15a. When the battery pack 5 is housed completely in the battery pack housing portion 4, the pinching portion 35b can be fitted into the concave portion 15b.

FIG. 5B is a perspective view showing a state where the battery pack 5 is housed completely in the battery pack housing portion 4. In the state shown in FIG. 5B, the pinching portion 35a is fitted into the concave portion 15a of the battery pack 5. The pinching portion 35b is fitted into the concave portion 15b of the battery pack 5. By the pinching portions 35a and 35b being fitted into the concave portions 15a and 15b, respectively, the battery pack 5 is held in the battery pack housing portion 4.

According to this configuration, even if the main body 1 is vibrated while housing the battery pack 5, since the battery pack 5 is held by being sandwiched between the pinching portions 35a and 35b, the vibrations in the vicinity of the battery side connector 12 in the battery pack 5 housed in the battery pack housing portion 4 can be suppressed. As a result, sliding between terminal electrodes 22b of the main body side connector 22 and the electrodes 12b of the battery side connector 12 can be reduced, and thus wear of the terminal electrodes 22b and/or the electrodes 12b can be reduced, thereby allowing a contact failure to be avoided.

The following describes in detail a process of housing the battery pack 5 in the battery pack housing portion 4.

FIG. 6 is a plan view showing a state where the front surface 16 of the battery pack 5 is inserted partially into the battery pack housing portion 4 and the battery pack 5 has come in contact with the first inclined portions 34a and 34b.

In FIG. 6, a straight line 41 is a line indicating a center in the width direction of the battery pack housing portion 4 (direction in which the electrodes 12b are arranged). When the battery pack 5 is housed in the battery pack housing portion 4, both ends in the width direction of the front surface 16 of the battery pack 5 come in contact with the first inclined portions 34a and 34b, respectively, and thus the battery pack 5 is displaced to a position at which its center line coincides with the straight line 41. This allows a direction of the battery side connector 12 and a direction of the main body side connector 22 in which they are connected to each other to be aligned. Thus, when the battery pack 5 is housed in the battery pack housing portion 4, no friction due to sliding between the electrodes 12b and the terminal electrodes 22b is generated, thereby allowing wear attributable to such friction to be suppressed.

As shown in FIG. 6, a width W2 of the battery pack housing portion 4 is made to be larger than a width W1 of the battery pack 5. This makes it easier for the battery pack 5 to be inserted into the battery pack housing portion 4 but may cause the battery pack 5 to be displaced from a proper position (position at which the center line coincides with the straight line 41). If the first inclined portions 34a and 34b are not provided, when being inserted into the battery pack housing portion 4, the battery pack 5 may be shifted, for example, in parallel along a sliding surface 4a with respect to the battery pack housing portion 4, so that the center line is displaced to a position indicated by a broken line 42. Further, the battery pack 5 may be shifted, for example, by being rotated along the sliding surface 4a, so that the battery pack 5 is inserted into the battery pack housing portion 4, in such a posture that the center line is inclined as indicated by an alternate long and short dashed line 43. In FIG. 6, for ease of viewing the drawing, each of the broken line 42 and the alternate long and short dashed line 43 is shown to have a displacement amount larger than an actual displacement amount with respect to the straight line 41.

In the case where, as shown in FIG. 6, the battery pack 5 is shifted in parallel along the sliding surface 4a in a direction indicated by an arrow C, so that the center line of the battery pack 5 is displaced to a position at which it coincides with the broken line 42, the position of the battery side connector 12 is shifted with respect to the main body side connector 22 in the direction indicated by the arrow C. If the battery pack 5 is housed in the battery pack housing portion 4 and the terminal electrodes 22b are inserted into the concave portions of the electrodes 12b in a state where the position of the battery side connector 12 is shifted with respect to the main body side connector 22, on a side indicated by the arrow C with respect to the electrodes 12b of the battery side connector 12 and the terminal electrodes 22b of the main body side connector 22, a large friction force is generated due to sliding. Because of this, the wear on the electrodes 12b and the terminal electrodes 22b increases, thus making it more likely that a contact failure occurs between the battery side connector 12 and the main body side connector 22. Moreover, when housing the battery pack 5 in the battery pack housing portion 4, if the respective positions of the terminal electrodes 22b and the concave portions of the electrodes 12b are shifted completely, there may be a case where, among the terminal electrodes 22b, a terminal electrode 22c whose end protrudes most from the main body side connector 22 collides with the battery side connector 12, so that the terminal electrode 22c or the main body side connector 22 including the same are damaged. Consequently, an electrical connection between the battery pack 5 and the battery pack housing portion 4 no longer can be established.

Furthermore, if the battery pack 5 is housed in the battery pack housing portion 4, in an inclined posture (such a posture that the center line of the battery pack 5 coincides with the alternate long and short dashed line 43), at a side surface on a side indicated by the arrow D and at an opening portion on the side indicated by the arrow C with respect to the electrodes 12b, a large friction force is generated due to sliding. Further, at each tip of the terminal electrodes 22b and at a side surface on the side indicated by the arrow C with respect to the terminal electrodes 22b, a large friction force is generated due to sliding. Because of this, the wear on the electrodes 12b and the terminal electrodes 22b increases, thus making it more likely that a contact failure occurs between the battery side connector 12 and the main body side connector 22. Moreover, when housing the battery pack 5 in the battery pack housing portion 4, there may be a case where the terminal electrodes 22b come in contact with the front surface 16 of the battery pack 5 to cause the terminal electrodes 22b to be bent. When bent, the terminal electrodes 22b cannot be inserted into the concave portions of the electrodes 12b, so that an electrical connection between the battery pack 5 and the battery pack housing portion 4 no longer can be established.

In this embodiment, when the battery pack 5 is moved to a direction indicated by an arrow A from the state shown in FIG. 6, both ends of the front surface 16 of the battery pack 5 press the first inclined portions 34a and 34b. Thus, the first inclined portion 34a receives a force in a direction indicated by the arrow D to cause the pinching portion 35a to be displaced in the direction indicated by the arrow D. Similarly, the first inclined portion 34b receives a force in a direction indicated by an arrow F to cause the pinching portion 35b to be displaced in the direction indicated by the arrow F. That is, in the case where the battery pack 5 is inserted in a state of being shifted from the center in the width direction of the sliding surface 4a in the battery pack housing portion 4 (direction indicated by an arrow C or an arrow D in FIG. 5B), there occurs a difference between forces exerted on the battery pack 5 from the two pinching portions 35a and 35b, respectively, so that a force is exerted in a direction in which the battery pack 5 is moved to the center in the width direction of the battery pack housing portion 4. Therefore, when the battery pack 5 is connected electrically to the battery pack housing portion 4, the electrodes 12b of the battery side connector 12 are positioned in respective proper positions relative to the terminal electrodes 22b of the main body side connector 22.

For example, in the case where the battery pack 5 is inserted into the battery pack housing portion 4 in a posture shifted to a position at which its center line coincides with the broken line 42 (see FIG. 6), a force with which the battery pack 5 presses the first inclined portion 34b becomes larger than a force with which it presses the first inclined portion 34a. Consequently, a force in a direction indicated by an arrow E applied to the battery pack 5 from the first inclined portion 34b becomes larger than a force in the direction indicated by the arrow C applied to the battery pack 5 from the first inclined portion 34a. Thus, a force is exerted on the battery pack 5 in the direction indicated by the arrow D to cause the battery pack 5 to be displaced in the direction indicated by the arrow D. The center line of the battery pack 5 is displaced to a position at which it coincides with the straight line 41, and thus the battery pack 5 is adjusted positionally to a proper position.

Furthermore, in the case where the battery pack 5 is inserted into the battery pack housing portion 4, in a posture inclined to a position at which its center line coincides with the alternate long and short dashed line 43 (see FIG. 6), a force with which the battery pack 5 presses the first inclined portion 34a becomes larger than a force with which it presses the first inclined portion 34b. Consequently, a force in the direction indicated by the arrow C applied to the battery pack 5 from the first inclined portion 34a becomes larger than a force in the direction indicated by the arrow E applied to the battery pack 5 from the first inclined portion 34b. Thus, a force that displaces the front surface 16 side of the battery pack 5 in the direction indicated by the arrow C and displaces the side opposite to the front surface 16 of the battery pack 5 in the direction indicated by the arrow D is exerted on the battery pack 5 to rotate the battery pack 5. The center line of the battery pack 5 is displaced to a position at which it coincides with the straight line 41, thereby adjusting the inclination of the battery pack 5, and thus the battery pack 5 is adjusted positionally to a proper position.

Therefore, friction generated due to sliding between the electrodes 12b of the battery side connector 12 and the terminal electrodes 22b of the main body side connector 22 can be reduced, thereby allowing wear to be reduced. This allows a contact failure that occurs between the battery side connector 12 and the main body side connector 22 to be suppressed.

FIG. 7 is a plan view showing a state where the battery pack 5 is inserted further from the position shown in FIG. 6 into the battery pack housing portion 4. When the battery pack 5 is inserted further from the position shown in FIG. 6 into the battery pack housing portion 4, the pinching portions 35a and 35b are pressed by the battery pack 5, and thus a still larger force than the force exerted on the pinching portions 35a and 35b in the state shown in FIG. 6 is exerted on the pinching portions 35a and 35b. The pinching portion 35a is displaced in a direction indicated by an arrow D and comes in contact with the side surface 13a of the battery pack 5. The pinching portion 35b is displaced in a direction indicated by an arrow E and comes in contact with the side surface 13b of the battery pack 5. In this state, the battery pack 5 is held by being sandwiched between the pinching portions 35a and 35b, and thus it is unlikely that the battery pack 5 is shifted in a parallel direction with respect to the sliding surface 4a of the battery pack housing portion 4. Further, the pinching portions 35a and 35b are at a short distance from the deepest portion 21 side of the main body side connector 22, and thus a shift amount in a rotation direction of the battery pack 5 is virtually negligible.

Preferably, in a state where a positional adjustment and an inclination adjustment of the battery pack 5 have been completed using the pinching portions 35a and 35b so that the battery pack 5 is positioned at the center of the battery pack housing portion 4, as shown in FIG. 7, the electrodes 12b of the battery side connector 12 and the terminal electrodes 22b of the main body side connector 22 are not in contact with each other. That is, preferably, as shown in FIG. 6, where a distance between the boundary portions 36a and 36b and the deepest portion 21 side of the mounting stage 27 is indicated as L1, and a distance between the end of the terminal electrode 22c that protrudes most among ends of the terminal electrodes 22b and the deepest portion 21 side of the mounting table 27 is indicated as L2, the following inequality is satisfied:

$$L1 > L2.$$

In other words, preferably, the boundary portions 36a and 36b are disposed on a side closer to the opening of the battery pack housing portion 4 than any of the ends of the terminal electrodes 22b.

In the case where the electrodes 12b of the battery side connector 12 and the terminal electrodes 22b of the main body side connector 22 come in contact with each other before the completion of a positional adjustment and an inclination adjustment of the battery pack 5, the occurrence of friction between the electrodes 12b and the terminal electrodes 22b increases, and thus the possibility of wear increases. Consequently, it becomes more likely that a contact failure occurs between the electrodes 12b and the terminal electrodes 22b than in the case where the battery side connector 12 is joined to the main body side connector 22 after the completion of the positional adjustment and the inclination adjustment of the battery pack 5.

FIG. 8 is a plan view showing a state where the battery pack 5 is inserted completely into the battery pack housing portion 4. The battery pack 5 is inserted further from the position shown in FIG. 7 into the battery pack housing portion 4, and when the battery pack 5 is inserted to a predetermined position, the front surface 16 comes in contact with the deepest portion 21. When the front surface 16 is in contact with the deepest portion 21 or when the front surface 16 is positioned in the vicinity of the deepest portion 21, the pinching portion 35a is fitted into the concave portion 15a and the pinching portion 35b is fitted into the concave portion 15b. By this configuration in which the pinching portion 35a is fitted into the concave portion 15a and the pinching portion 35b is fitted into the concave portion 15b, the battery pack 5 is held in the battery pack housing portion 4.

If, in a state where the battery pack 5 is housed completely in the battery pack housing portion 4, the main body 1 is subjected to an impact or is vibrated, the battery pack 5 also is vibrated in the battery pack housing portion 4. However, since the pinching portions 35a and 35b hold portions of the battery pack 5 in the vicinity of the main body side connector 22 by sandwiching them therebetween, the amount of vibrations at a portion of the battery pack 5 near the battery side connector 12 is small. Therefore, wear due to slight sliding between the electrodes 12b of the battery side connector 12 and the terminal electrodes 22b of the main body side connector 22 can be reduced, and thus a contact failure can be made less likely to occur.

Furthermore, since the pinching portions 35a and 35b hold the battery pack 5 by sandwiching it therebetween, even if the lid body 3 shown in FIG. 1 is opened by accident, the battery pack 5 is unlikely to fall out. The battery pack 5 thus can be prevented from being damaged as a result of a fall. Further, since the battery pack 5 is made unlikely to fall out, it is possible to prevent a power supply from being cut off during the operation of the main body 1, which could result in data stored primarily in a memory in the main body 1 being erased.

The description is directed next to an operation in which the battery pack 5 held by the pinching portions 35a and 35b is released therefrom. In order to take the battery pack 5 out of the battery pack housing portion 4, when, for example, the pull-out tape 11 (see FIG. 5B) is pulled in a direction indicated by an arrow B in FIG. 8, the concave portion 15a of the battery pack 5 and the second inclined portion 37a come in contact with each other, so that a force is applied to the second inclined portion 37a in a direction indicated by an arrow D. In the case where the force exerted on the second inclined portion 37a is larger than a bias force exerted on the pinching portion 35a, the pinching portion 35a is moved in the direction indicated by the arrow D, so that the pinching portion 35a fitted into the concave portion 15a is released from that state.

Similarly, when the battery pack 5 is pulled in the direction indicated by the arrow B in FIG. 8, the concave portion 15b of the battery pack 5 and the second inclined portion 37b come in contact with each other, so that a force is applied to the second inclined portion 37b in a direction indicated by an arrow F. In the case where the force exerted on the second inclined portion 37b is larger than a bias force exerted on the pinching portion 35b, the pinching portion 35b is moved in the direction indicated by the arrow F, so that the pinching portion 35b fitted into the concave portion 15b is released from a fitted state.

Even in the case where the pinching portions 35a and 35b fitted into the concave portions 15a and 15b, respectively, are released from fitted states, in a state where the terminal electrodes 22b of the main body side connector 22 are in contact with the electrodes 12b of the battery side connector 12, the pinching portions 35a and 35b are holding the side surfaces 13a and 13b of the battery pack 5 by sandwiching them therebetween. Therefore, wear of the electrodes 12b and the terminal electrodes 22b due to slight sliding therebetween and/or damage thereof caused by a positional shift of the battery pack 5 in a parallel direction with respect to the sliding surface 4a and an inclination shift with respect to the insertion/removal direction can be reduced, thereby allowing the suppression of a contact failure.

[4. Effect of Embodiments, etc.]

In the information processing device according to this embodiment, when the batter pack 5 is inserted into the battery pack housing portion 4, by the use of the pinching portions 35a and 35b, a positional shift and an inclination shift with respect to the insertion/removal direction of the battery pack 5 can be adjusted with respect to the battery pack housing portion 4. Further, since the pinching portions 35a and 35b hold portions of the battery pack 5 in the vicinity of the battery side connector 12 by sandwiching them therebetween, even if the main body 1 is vibrated and thus the battery pack 5 is vibrated in a state where the battery pack 5 is housed in the battery pack housing portion 4, the amount of vibrations at a portion near the battery side connector 12 can be reduced. Therefore, wear of the electrodes 12b of the battery side connector 12 and the terminal electrodes 22b of the main body side connector 22 can be reduced, thereby allowing the occurrence of a contact failure between the battery side connector 12 and the main body side connector 22 to be reduced.

Figure 9:
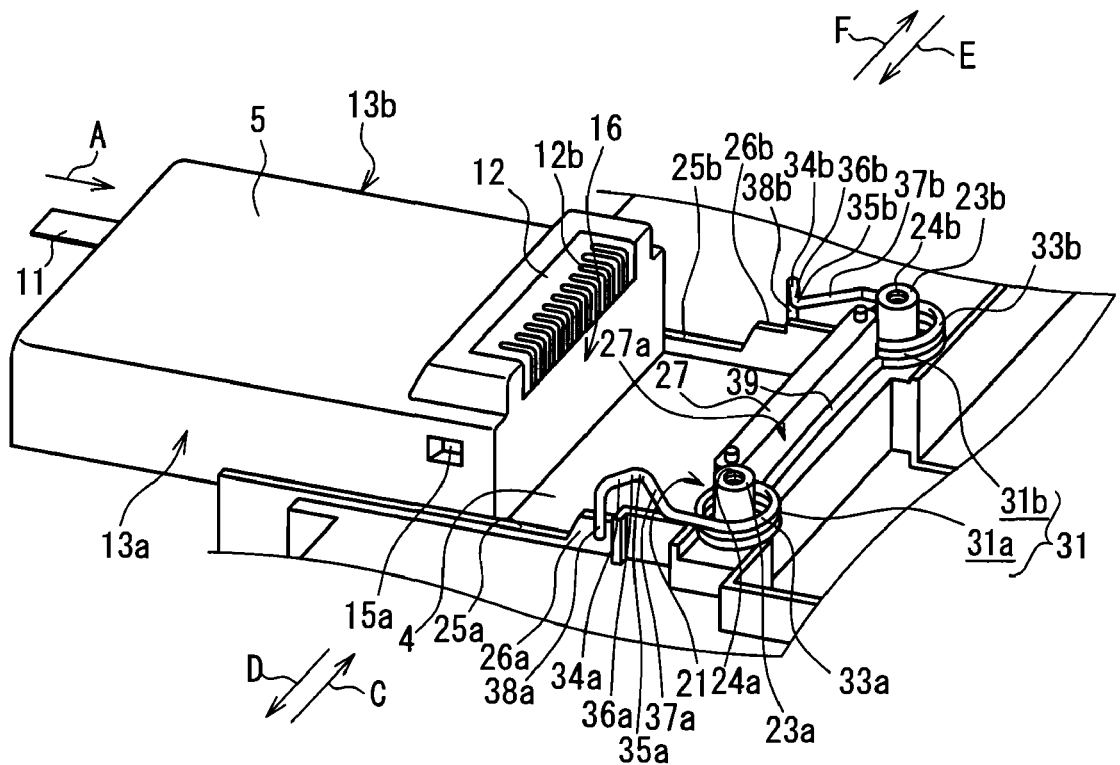
FIG. 9 is a perspective view of the vicinity of a battery pack housing portion in a main body according to still another embodiment of the present invention.
Figure 10:
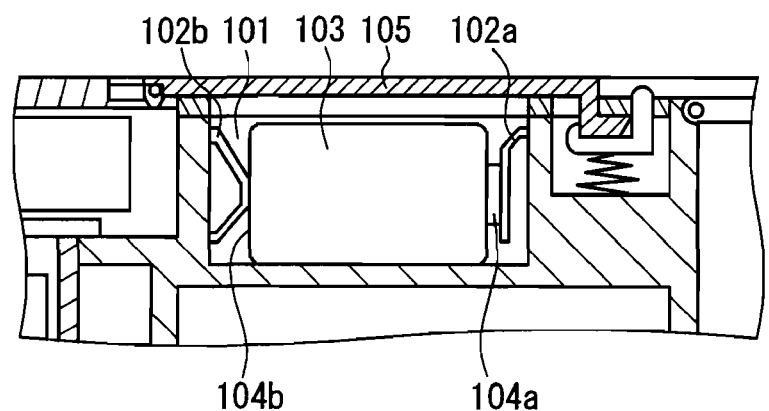
FIG. 10 is a cross-sectional view of a battery holding mechanism of a conventional camera.

FIG. 9 is a perspective view showing another configuration in the vicinity of the battery pack housing portion in the main body 1 according to this embodiment. A battery pack housing portion used in the main body 1 according to this embodiment is different from the battery pack housing portion used in the information processing device according to the previous embodiments in that the first holding member 31a and the second holding member 31b of the holding member 31 are formed as one unit, and other configurations thereof are similar to those in the information processing device according to the previous embodiments. In an information processing device according to this embodiment, constituent components similar to those of the information processing device according to the previous embodiments are identified by the same reference characters and descriptions thereof are omitted.

The holding member 31 consists of the first holding member 31a and the second holding member 31b that are linked to each other by means of a coupling portion 39 and thus are formed as one unit Since the holding member 31 is formed as one unit, compared with the information processing devices according to the previous embodiments, the number of components can be reduced from two to one. Therefore, the number of process steps for manufacturing the device can be reduced, and the cost can be reduced.

Moreover, the first holding member 31a and the second holding member 31b are formed of a single member, and thus bias forces exerted on the pinching portions 35a and 35b, respectively, can be made even. Therefore, a positional adjustment and an inclination adjustment with respect to the insertion/removal direction of the battery pack 5 can be performed with accuracy, and thus wear due to slight sliding between the electrodes 12b of the battery side connector 12 and the terminal electrodes 22b of the main body side connector 22 can be reduced further.

In the information processing device according to the above-described embodiment, a study was conducted to see the influence of wear due to slight sliding between the electrodes 12b of the battery side connector 12 and the terminal electrodes 22b of the main body side connector 22 in the case where the main body 1 is vibrated, with the battery pack 5 housed completely in the battery pack housing portion 4. In the case where the holding member 31 was formed so that the pinching portions 35a and 35b were positioned at a distance of 5 mm from the deepest portion 21 with which the front surface 16 of the battery pack 5 comes in contact, almost no influence of wear due to slight sliding was observed. Further, also in the case where the holding member 31 was formed so that the pinching portions 35a and 35b were positioned at a distance of 15 mm from the deepest portion 21, little influence of wear due to slight sliding was observed.

As described above, considering that the electrodes 12b of the battery side connector 12 and the ends of the terminal electrodes 22b of the main body side connector 22 come in contact with each other in a state where a positional adjustment and an inclination adjustment for adjusting the position of the battery pack 5 to the center of the battery pack housing portion 4 have been completed, satisfying the condition of L1>L2 allows wear and/or damage to be suppressed, which may occur when an electrical connection is established between the battery side connector 12 and the main body side connector 22. However, it is desirable that the relationship between L1 and L2 approximate as much as possible to L1=L2 under the above-described condition.

The above-described embodiments explain an exemplary case where the holding member 31 is made of a line-shaped metal. However, the present invention is not limited to this example, and the holding member 31 may be made of a material having resilient elasticity such as a flexible resin. Further, the holding member 31 may be plate-shaped. In the case where the holding member 31 is plate-shaped, a configuration also is possible in which, without forming the wire wound portions 33a and 33b, the holding member 31 is fixed to the exterior of the battery pack housing portion 4, and guide members are formed by bending the holding member 31 to different directions from a longitudinal direction of the coupling portion 39.

Furthermore, although the above-described embodiments explain the configuration in which the concave portions 15a and 15b are formed in the battery pack 5, the concave portions 15a and 15b are not necessarily required. In the case of the battery pack 5 in which the concave portions 15a and 15b are not formed, since the pinching portions 35a and 35b hold the side surfaces 13a and 13b of the battery pack 5 by sandwiching them therebetween, the battery pack 5 can be fixed in the insertion/removal direction. However, it is preferable to form the concave portions 15a and 15b because in that case, the battery pack 5 can be fixed more firmly, and in a state where the battery pack 5 is housed in the battery pack housing portion 4, a bias force of the holding member 31 can be weakened, thereby allowing a change over time of the holding member 31 to be lessened.

Furthermore, a configuration also is possible in which slot portions for leading the pinching portions 35a and 35b to the concave portions 15a and 15b, respectively, are provided on the side surfaces 13a and 13b of the battery pack 5. By this configuration, the battery pack 5 is inserted with the pinching portions 35a and 35b fitted into the slot portions, respectively, and thus it is possible to lead the pinching portions 35a and 35b reliably to the concave portions 15a and 15b, respectively.

Furthermore, although the embodiments of the present invention show the configuration in which the pinching portions 35a and 35b are provided on surfaces of the battery pack housing portion 4, which are opposed to each other in the width direction of the battery pack housing portion 4, a configuration also is possible in which the pinching portions 35a and 35b are provided on surfaces of the battery pack housing portion 4, which are opposed to each other in the height direction of the battery pack housing portion 4.

Furthermore, although the above description shows an example in which the pull-out tape 11 is disposed in the battery pack 5 in order to take the battery pack 5 out of the battery pack housing portion 4, any other configurations also may be adopted as long as the battery pack 5 can be taken out. For example, a projection for pulling out the battery pack 5 may be provided on a rear surface (back surface with respect to the front surface 16) of the battery pack 5, or alternatively, a concave portion may be provided on an upper surface (surface on which the battery side connector 12 is disposed) of the battery pack 5 so that the user can hook his/her finger thereon to pull out the battery pack 5.

Furthermore, although each of the embodiments explains a tablet type information processing device as an example, a similar effect can be obtained also in the case of using the battery pack holding mechanism according to the present invention in an information processing device using a replaceable battery such as a personal computer, a digital camera or the like.

The battery pack 5 described in the embodiments of the present invention is one example of the battery pack according to the present invention. The battery side connector 12 described in the embodiments of the present invention is one example of the connector according to the present invention. The main body side connector 22 described in the embodiments of the present invention is one example of the terminal electrode according to the present invention. The battery pack housing portion 4 described in the embodiments of the present invention is one example of the battery pack housing portion according to the present invention. Each of the holding member 31, the holding member 40, the first holding member 31a, and the second holding member 31b described in the embodiments of the present invention is one example of the holding member according to the present invention. The pinching portions 35a and 35b described in the embodiments of the present invention is one example of the pinching portions according to the present invention. Each of the first inclined portions 34a and 34b described in the embodiments of the present invention is one example of the first inclined portion according to the present invention. Each of the second inclined portions 37a and 37b described in the embodiments of the present invention is one example of the second inclined portion according to the present invention. Each of the boundary portions 36a and 36b described in the embodiments of the present invention is one example of the boundary portion according to the present invention. The coupling portion 32 described in the embodiments of the present invention is one example of the coupling portion according to the present invention. Each of the concave portions 14a and 14b described in the embodiments of the present invention is one example of the fitting concave portion according to the present invention. Each of the guide slots 15a and 15b described in the embodiments of the present invention is one example of the guide slot according to the present invention.

The present invention provides an effect that wear due to slight sliding between a battery side connector and a main body side connector in a state where a battery pack is housed in a battery pack housing portion is reduced, thereby allowing the occurrence of a contact failure to be reduced, and can be used in electronic devices.

The following notes are disclosed in relation to the embodiments of the present invention.

[Note 1]

A battery pack holding mechanism that can hold a battery pack with an end provided with a connector, including:

a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion, wherein the holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

[Note 2]

The battery pack holding mechanism according to Note 1, wherein the holding member includes:

a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted, each of the pinching portions is formed between the first inclined portion and the second inclined portion, and a boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion.

[Note 3]

The battery pack holding mechanism according to Note 1 or 2, wherein the holding member has a coupling portion that couples the pair of pinching portions to each other.

[Note 4]

An electronic device, including:

a battery pack with an end provided with a connector;

an electronic component that is brought to an active state using power supplied from the battery pack;

a circuit substrate on which the electronic component is mounted; and a battery pack holding mechanism that can hold the battery pack, wherein the battery pack holding mechanism includes:

a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion, and the holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

[Note 5]

The electronic device according to Note 4, wherein the holding member includes:

a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted, each of the pinching portions is formed between the first inclined portion and the second inclined portion, and a boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion.

[Note 6]

The electronic device according to Note 4 or 5, wherein the holding member has a coupling portion that couples the pair of pinching portions to each other.

[Note 7]

The electronic device according to Note 4, wherein the battery pack includes a fitting concave portion into which each of the pinching portions can be fitted.

[Note 8]

The electronic device according to Note 7, wherein the battery pack includes a guide slot that can guide each of the pinching portions to the fitting concave portion.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A battery pack holding mechanism that can hold a battery pack with an end provided with a connector, comprising:

a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion, wherein the holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

2. The battery pack holding mechanism according to claim 1, wherein the holding member comprises:

a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted, each of the pinching portions is formed between the first inclined portion and the second inclined portion, and a boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion.

3. The battery pack holding mechanism according to claim 2, wherein the holding member has a coupling portion that couples the pair of pinching portions to each other.

4. The battery pack holding mechanism according to claim 1, wherein the holding member has a coupling portion that couples the pair of pinching portions to each other.

5. An electronic device, comprising:

a battery pack with an end provided with a connector;

an electronic component that is brought to an active state using power supplied from the battery pack;

a circuit substrate on which the electronic component is mounted; and a battery pack holding mechanism that can hold the battery pack, wherein the battery pack holding mechanism comprises:

a battery pack housing portion in which a terminal electrode that is connected electrically to an electrode of the connector is disposed and into which the battery pack can be housed by being inserted along a pair of side walls; and a holding member that can hold the battery pack housed in the battery pack housing portion, and the holding member is disposed inside the pair of side walls in a vicinity of the terminal electrode and has a pair of pinching portions that are orthogonal to an insertion/removal direction in which the battery pack is inserted/removed and protrude toward opposed surfaces constituting an outer periphery of the battery pack, respectively.

6. The electronic device according to claim 5, wherein the holding member comprises:

a first inclined portion that is inclined from an exterior toward an interior of the battery pack housing portion with respect to a direction in which the battery pack is inserted into the battery pack housing portion; and a second inclined portion that is inclined from the interior toward the exterior of the battery pack housing portion at a position forward of a position at which the first inclined portion is formed in the direction in which the battery pack is inserted, each of the pinching portions is formed between the first inclined portion and the second inclined portion, and a boundary portion between the first inclined portion and the each of the pinching portions is disposed on a side of a housing opening through which the battery pack is housed in the battery pack housing portion relative to an end of the terminal electrode, which protrudes toward the interior of the battery pack housing portion.

7. The electronic device according to claim 6, wherein the holding member has a coupling portion that couples the pair of pinching portions to each other.

8. The electronic device according to claim 5, wherein the holding member has a coupling portion that couples the pair of pinching portions to each other.

9. The electronic device according to claim 5, wherein the battery pack includes a fitting concave portion into which each of the pinching portions can be fitted.

10. The electronic device according to claim 9, wherein the battery pack includes a guide slot that can guide each of the pinching portions to the fitting concave portion.

\* \* \* \* \*